United States Patent [19]

Hartenstine et al.

[11] Patent Number: 5,800,023
[45] Date of Patent: Sep. 1, 1998

[54] AXLE AND WHEEL MOUNT ASSEMBLY

[75] Inventors: Curtis Michael Hartenstine; Kristopher Konawalik, both of Birdsboro, Pa.

[73] Assignee: Graco Children's Products Inc., Elverson, Pa.

[21] Appl. No.: 738,234

[22] Filed: Oct. 25, 1996

[51] Int. Cl.⁶ .................................................. B60B 37/00
[52] U.S. Cl. ...................... 301/111; 301/121; 280/654
[58] Field of Search ................................ 301/111, 112, 301/120, 121, 122, 124.1, 125; 280/647, 652, 654

[56] References Cited

U.S. PATENT DOCUMENTS

| | | | |
|---|---|---|---|
| 2,901,261 | 8/1959 | Olvey | 280/654 |
| 4,043,685 | 8/1977 | Hyams | 301/121 X |
| 5,144,717 | 9/1992 | Siesholtz et al. | 16/47 |
| 5,277,480 | 1/1994 | Chiu | 301/111 |
| 5,408,723 | 4/1995 | Julien et al. | 16/30 |

FOREIGN PATENT DOCUMENTS 2911406 10/1980 Germany ........................ 301/112

Primary Examiner—Russell D. Stormer
Attorney, Agent, or Firm—Richard B. O'Planick

[57] ABSTRACT

An axle and wheel mount assembly for improving packaging efficiency and allowing easy wheel attachment and removal is disclosed. The axle and wheel assembly includes a novel axle mounting system that is adapted to hold several short axles instead of one long axle which spans the entire width of the transporter. The axle and wheel assembly also includes a novel wheel attachment system which allows wheel attachment and removal without the use of tools and prevents the wheels from accidentally disengaging from the axle.

16 Claims, 4 Drawing Sheets

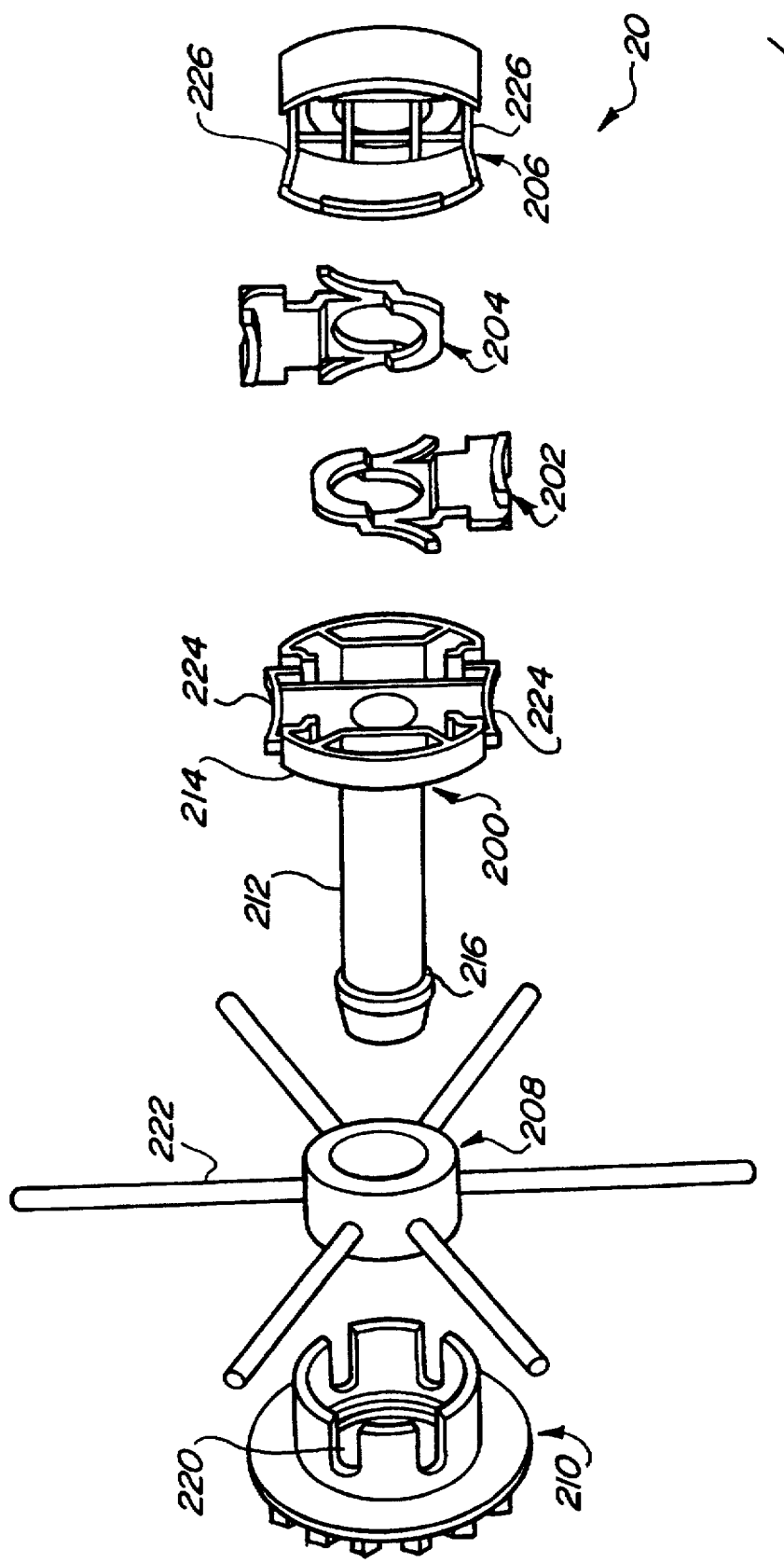

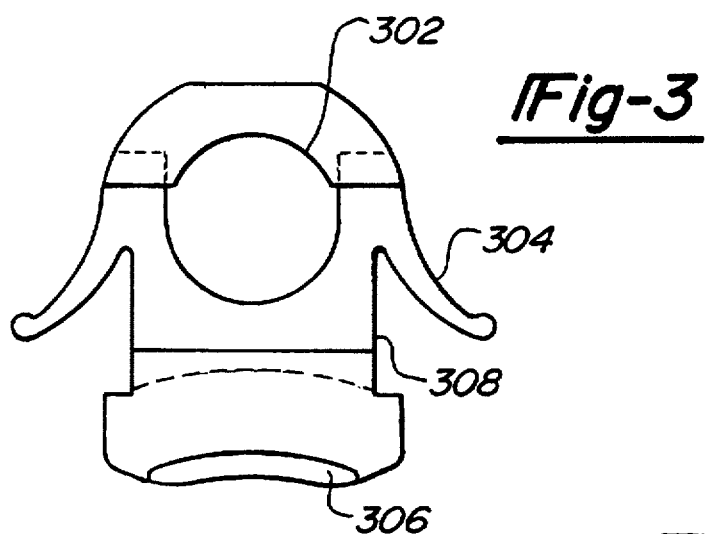
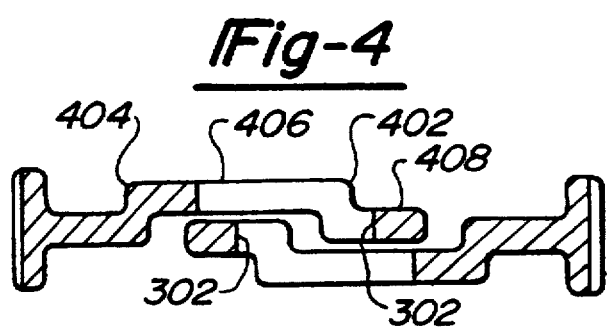
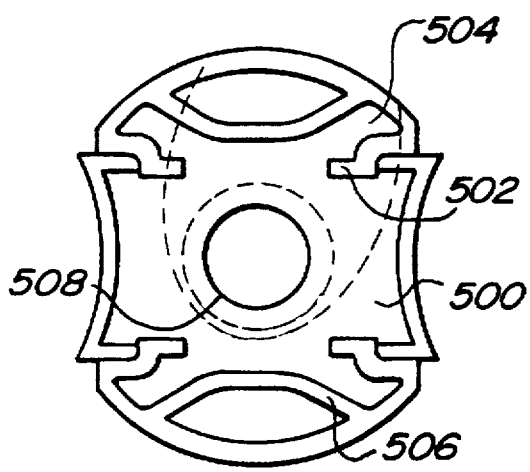
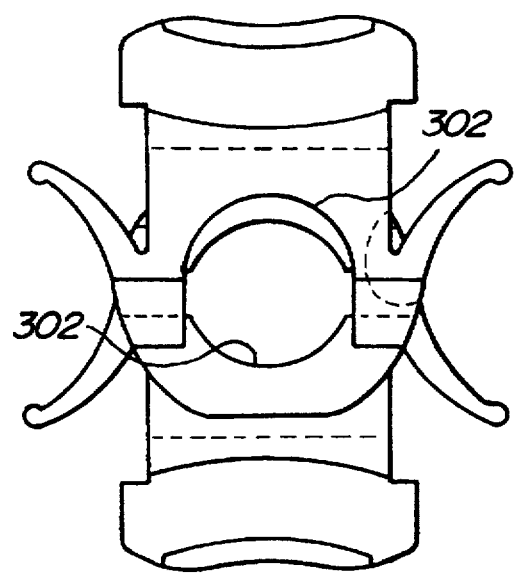

AXLE AND WHEEL MOUNT ASSEMBLY

BACKGROUND OF THE INVENTION

I. Field of Invention

The present invention relates to a wheel and axle assembly for a child stroller, a bassinet, a baby buggy or similar device used to support or transport a person.

II. Description of Related Art

Conventional wheel and axle assemblies suffer from several disadvantages. In the past, wheels and axles were rigidly fixed to the transporter on which they were used. This makes the transporter extremely bulky and very expensive to ship.

Later, wheels became removable. This technique reduced bulk, but also caused shipping problems. With the wheels removed, the transporter would shift in its storage container and the bare axle shafts would create holes in the container. Attempts to solve this problem involved wrapping the axles with large quantities of packing material, for example, Styrofoam, bubble wrap, padded tape or cardboard. However, this method further increased packing difficulty.

Other conventional designs allowed the axles to be removed completely from the frame on which they were mounted. However, this did not solve the problem because the bare axles, because of their length and weight, tended to be very difficult to properly cushion. Any attempt to cushion or pad the axle ends would tend to increase the size of the entire container. Consequently, any benefit in packing efficiency gained by removing the axles in the first place was negated.

Conventional wheel attachment mechanisms, including clip-type wheel fasteners, suffer from disadvantages of their own. For example, such mechanisms loosen or disengage from the axle if they experience impacts (ie., hitting a curb).

SUMMARY OF THE INVENTION

Accordingly, the present invention is directed to an improved wheel and axle assembly that substantially eliminates one or more of the problems or disadvantages found in the prior art.

An object of the present invention is to provide an assembly which improves packing efficiency.

Another objective of the present invention is to allow easy assembly and disassembly of the wheel without the use of tools.

Another object of the present invention is to allow easy and reliable installation of the axle.

Another object of the present invention is to reduce the cost and complexity of manufacturing the device.

Another object of the invention is to prevent accidental or inadvertent disengagement of the wheel from the axle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the invention includes an axle amount adapted to connect an axle to a frame member comprising an inner member located inward with respect to a frame, and including a frame member receiving portion to interface with the frame, an outer member located outward with respect to the frame member and opposite the inner member, the outer member including a frame receiving portion to interface with the frame; an axle shaft received by the inner member and the outer member; the axle shaft being held by at least one resilient member located on the inner member.

In another aspect, the invention includes a quick release hub for mounting a wheel on an axle comprising: a lock mount adapted to mount a wheel on an axle; a wheel lock, adjacent to the lock mount, adapted to engage the axle shaft at a mounting portion on the axle and; a spring member for biasing the wheel lock towards the axle to lock the wheel to the axle at the mounting portion.

It is to be understood that both the general description above, and the following detailed description are exemplary and explanatory and are intended to provide further explanation of the invention as claimed.

BRIEF DESCRIPTION OF THE DRAWINGS

The accompanying drawings which are included to provide a further understanding of the invention and constitute a part of this specification, illustrate embodiments of the invention and together with the written description, serve to explain the principles of the invention. In the drawings:

FIG. 2 is an exploded view of the hub;

FIG. 3 is a top view of a moving member;

FIG. 4 is a side view of a moving member;

FIG. 5 is a top view of the face of the lock mount;

FIG. 6 is a top view of two moving members associated in the lock position;

DESCRIPTION OF THE PREFERRED EMBODIMENTS

Reference will now be made in detail to the preferred embodiments of the present invention, examples of which are illustrated in the accompanying drawings.

The invention generally includes an inner member and an outer member which receive a frame and which also receive an axle shaft.

Figure 1:
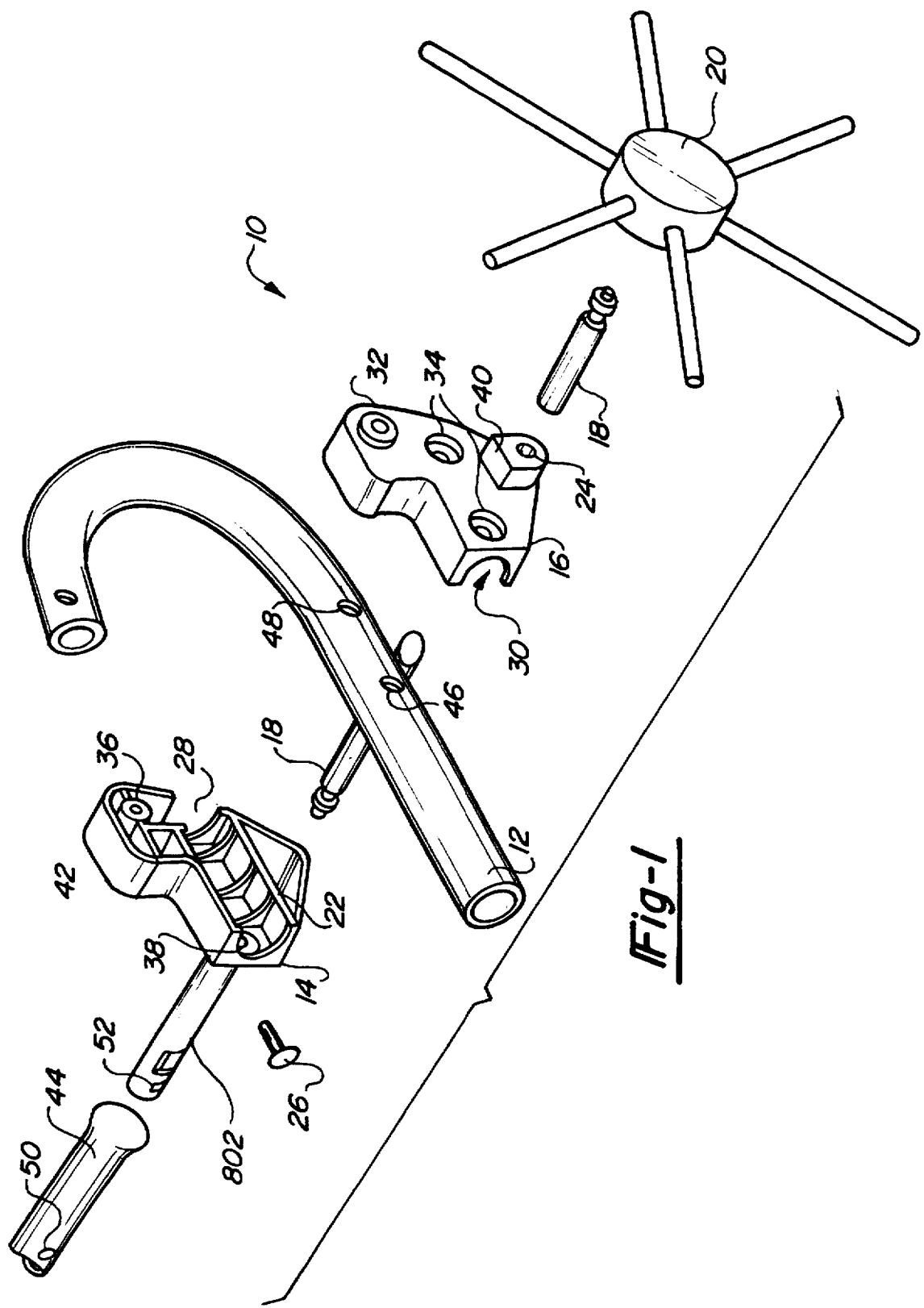
FIG. 1 is an exploded view of the axle mount assembly.

In the preferred embodiment of this invention, shown in FIG. 1, the inner member 14 and the outer member 16 receive a frame member 12, and both components are generally referred to as a frame receiving system. The aperture 22, of the inner member 14, aligns with aperture 24, of the outer member 16, to provide a mount for the axle shaft 18.

The axle shaft 18 (which is shown broken in FIG. 1) holds a wheel hub 20 on one end, and is secured to the inner member 14 on the other end. Although any conventional fastener could be used to secure the axle shaft 18 to the inner member 14, the preferred embodiment contemplates the use of a stop pin and a resilient member. The exemplary embodiment uses a rivet 26 as the stop pin and uses two snap fingers 804,806 as the resilient member.

Figure 8:
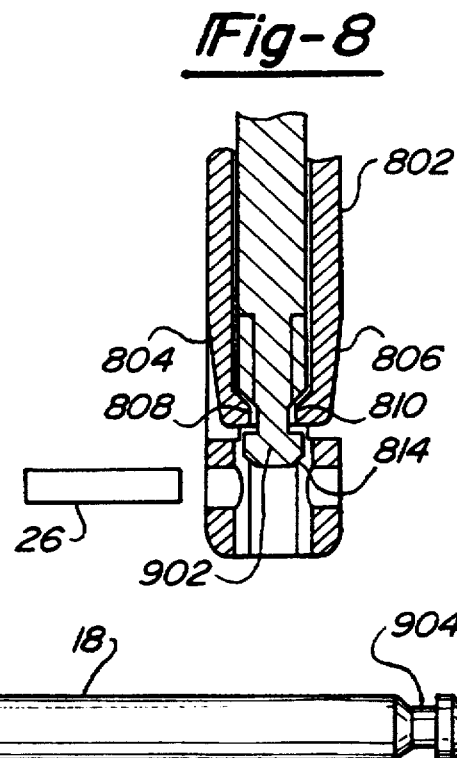
FIG. 8 is an enlarged cross-sectional view of the securing portion of the inner member tube.

FIG. 8 shows the details of the preferred securing arrangement of the axle shaft 18 to the inner member 22. The rivet 26, inserts into the rear tube portion 802 of inner member 14. The rivet 26 prevents the axle shaft 18 from extending beyond its securing position. Two resilient claws, or snap fingers, 804 and 806, biased radially inward, are disposed on opposite sides of the tube portion 802. The snap fingers 804 and 806 each have protrusions 808 and 810, respectively, which engage a circular slot 902 cut into the axle shaft 18. The axle shaft 18 also has a chamfer 814 at its end which allows the axle shaft 18 to pass through the protrusions 808 and 810 during insertion.

Returning to FIG. 1, the preferred frame receiving system includes a semi-cylindrical scallop 28 cut into the inner member 14, and a corresponding semi-cylindrical scallop 30 cut into the outer member 16. These two scallops 28 and 30 embrace opposite sides of the frame member 12. The inner and outer members 14 and 16 are held together and to the frame 12 by a set of rivets (not shown). These rivets extend into rivet holes 32 and 34 (on the outer member 16) and into rivet holes 36 and 38 (on the inner member 14). Rivet hole 32 mates with rivet hole 36. Rivet holes 34 and 38 are disposed within the scallops 30 and 28, respectively. This allows the rivets (not shown) which are disposed in rivet holes 34 and 36 to extend through apertures 46 and 48 in frame 12, thus providing additional strength to the joint.

Both the inner and outer members 14 and 16 have a series of strengthening ribs 42, on inner member 14 (not shown on outer member 16). The ribs on the outer member 16 are mirror images of the ribs 42 on the inner member 14. The outer member 16 includes a mounting boss 40. The inner member 14 also includes a mounting boss on the back side thereof (similar to mounting boss 40 shown in FIG. 1). The tube member 802 is mounted on this mounting boss. An exemplary embodiment of the invention includes a nested boss arrangement (not shown) provided at the interface of rivet holes 32 and 36, to assist in assembly of the inner member 14 and the outer member 16. With particular reference to Figures and 8, across tube 44 is used to connect the inner member 14 with a corresponding inner member on the other side of the device. The cross tube 44 fits over the tube member 802 (see FIG. 1) of the inner member 14 and, in a similar manner, also fits over the tube member (not shown) on the other side of the device. The cross tube 44 helps to stabilize the device and connects the frame member 12 with another frame member (not shown) on the other side of the device. Preferably, rivet 26 extends through an aperture 50 on the cross tube 44 and also extends through aperture 52 on the tube member 802. This allows the rivet 26 to fasten cross tube 44 to the tube member 802, and act as the stop pin that prevents the axle shaft 18 from extending beyond its securing position (see FIG. 8).

Another aspect of the invention provides for a wheel which is easily attached and detached without the use of tools. Specifically, this aspect of the present invention includes a lock mount, a wheel lock which is adjacent to the lock mount and engages the axle, and a spring member which biases the wheel lock towards the axle.

The preferred embodiment of the invention is shown in FIG. 2. The lock mount 200 has two general portions: a lock mount tube portion 212 and a face 214. The lock mount tube 212 extends through a spoke ring 208 and is secured to a brake gear 210. The lock mount face 214 supports the wheel lock. A cover 206 mounts onto the lock mount face 214 of lock mount 200 and helps to keep moving members 202 and 204 in place.

The invention provides easy wheel hub attachment by biasing the wheel lock towards the axle 18. A preferred embodiment of this inventive concept may be carried out by a moving member 202 or 204. The most preferred embodiment contemplates the use of two identical moving members. In the preferred embodiment, as shown in FIG. 3, the moving member 202 or 204 is an integral member which incorporates several separate elements. Each moving member 202,204 includes a wheel lock 302, a spring member 304, and a finger plate 306. Turning to the cross-sectional view, FIG. 4, it is apparent that the moving member 202 or 204 has two bends 402 and 404 which create a valley 406.

In the exemplary embodiment, two moving members 202 and 204 are used in conjunction with the face 214 to form a wheel lock. Two identical moving members 202 and 204 are assembled one adjacent to the other, with one of the members turned upside down and rotated 180° about it's longitudinal axis (see FIGS. 2, 6 and 7). As shown in FIG. 2, this configuration allows the valleys 406 of the moving members 204 to accommodate the outer periphery 408 of the other moving member 202. The valleys 406 are shaped in a way which allows relative sliding movement between the two moving members 202 and 204. In other words, the moving members can slide with respect to one another and with respect to their housing.

Once the two moving members 202 and 204 are properly associated, they are then placed onto the face of the lock mount 214. The two moving members 202 and 204 mount in a nest 500 (see FIG. 5) specifically designed to receive the moving members 202 and 204. The nest 500 includes alignment flanges 502 which bear against the inner sides 308 (see FIG. 3) of the moving members 202 and 204. These flanges help to insure that the moving members 202,204 can slide only linearly. The nest 500 also includes a series of curved slots 504 to accommodate the spring members 304 (see FIG. 3) on the moving members 202 and 204. The nest 500 also includes a series of cam surfaces 506 which cooperate with the outer surface of spring members 304 (see FIG. 3) to bias the moving members 202 and 204 radially outward (ie., to the left and to the right in FIG. 5) with respect to the central aperture 508 of the lock mount 214.

Figure 7:
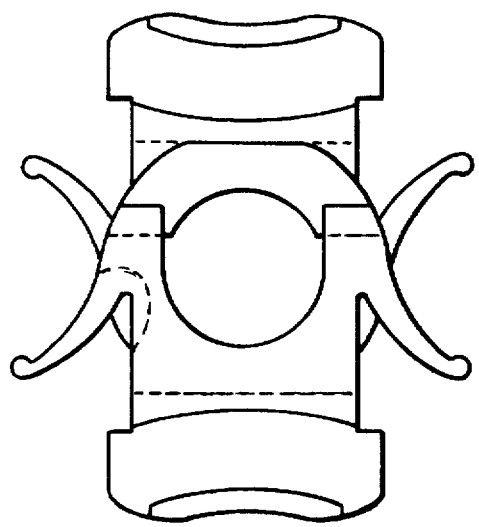
FIG. 7 is a top view of two moving members associated in the release position.

The operation of the two moving members 202 and 204 can be seen in FIGS. 4, 6 and 7. FIG. 6 shows the installed position of the two moving members 202,204. The two wheel locks 302 engage a slot 904 on the axle shaft 18 (see FIG. 2), and are positioned with respect to one another to securely hold the wheel hub 20 on the axle shaft 18. Because the wheel locks 302 substantially surrounds the axle, the possibility of accidental or inadvertent release of the axle shaft 18 from any single direction is greatly reduced.

FIG. 7 is a view showing the actuated, installation or removal position. In this view, finger plates 306 on the moving members 202 and 204 have been squeezed together. A user can depress moving members 202 and 204 because the finger plates 306 of each of the moving members 202 and 204 protrude beyond the outer periphery 224 of the face 214 of the lock mount 200 and the outer periphery 226 of the cover 206. Because the finger plates 306 are exposed, this allows easy access to the finger plates 306, and eliminates the need for tools to actuate the moving members 202 and 204.

The sliding of the moving members 202 and 204 together, i.e., radially inward towards the central aperture 508 (see FIG. 5), causes the spring members 304 to deflect towards the body of the moving members 202 and 204 because of the cam surfaces 506 (see FIG. 5). Squeezing the moving members 202 and 204 together also moves the wheel locks 302 radially outward and away from the central aperture 508

(see FIG. 5). This allows the wheel locks 302 to clear slot 904 (see FIG. 9) on the axle shaft 18 and allows the operator to quickly and easily install or remove the wheel (not shown) from the axle shaft 18. If the user wishes to install the wheel hub 20 the user slides the wheel hub 20 into position (i.e., wheel locks 302 aligned with the slot 904) and allows the spring members 304 to bias the moving members 202 and 204 radially outward, thus moving the wheel locks 302 radially inward, and securing the wheel to the axle.

Figure 9:
FIG. 9 is a side view of the axle shaft.

As shown in FIG. 9, slot 902 (see FIG. 8) and slot 904 are identical. This provides an important advantage because the axle shaft 18 may be inserted into the inner member 14 in either orientation.

Figure 11:
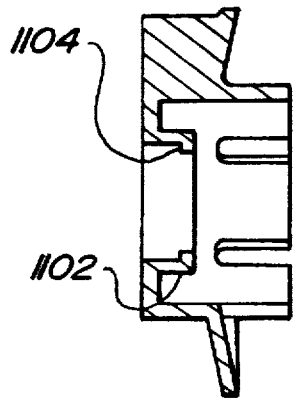
FIG. 11 is a cross-section taken at line X—X of FIG. 9.

Lock mount 200 is secured to the wheel hub 20, and thus the wheel (not shown) by the lock mount tube 212. The lock mount tube 212 has a shoulder 216 which engages opposing shoulders 1104 of the snap lock ring 1102 (see FIG. 11). The brake gear 210 has spoke slots 220 which align and mate with spokes 222.

Figure 10:
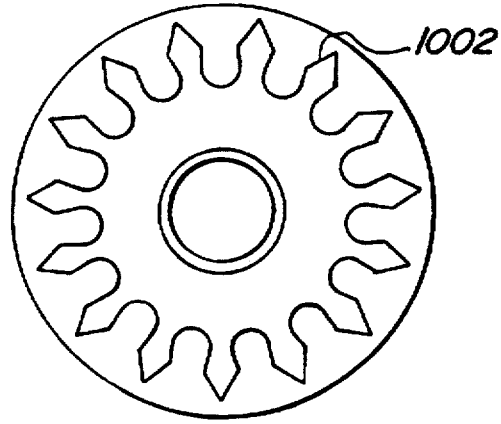
FIG. 10 is a back view of the brake gear.

The inner portion of wheel hub 20 (see FIG. 2) is formed by the inner side (shown in FIG. 10) of brake gear 210. The cogs 1002 are used with a braking system in which a foot petal actuates a pawl that intermeshes with the cogs to lock the wheel that is attached to the brake gear 210. In the preferred embodiment, the lock mount 200 is secured to the brake gear 210 in the manner discussed above.

Thus, the brake gear 210 is rigidly related to (i.e., rotates with) the wheel hub 20 via spokes 222 and spoke slots 220. The lock mount 200, which includes wheel lock 302 (see FIGS. 3 and 6), is rigidly related to the brake gear 210. Therefore, the wheel locks 302 can mount and dismount the wheel hub 20 on the axle 18, because they are rigidly related with the wheel hub 20.

It will be apparent to those skilled in the art that various modifications and variations can be made in the wheel and axle assembly of the present invention without departing from the spirit or scope of the invention. Thus, it is intended that the present invention cover the modifications and variations of this invention provided they come within the scope of the appended claims and their equivalents.

We claim:

1. An assembly for releasably mounting a wheel to an axle shaft having a mounting portion, the assembly comprising:
    a lock mount adapted to mount the wheel on the axle shaft;
    a wheel lock adjacent to the lock mount, the wheel lock being adapted to engage the mounting portion of the axle shaft;
    cover associated with the lock mount such that the wheel lock is captured between the lock mount and the cover;
    means for actuating the moving members extending beyond the outer periphery of the cover; and
    means for biasing the wheel lock radially inward towards the axle shaft such that the wheel is secured to the axle shaft at the mounting portion.

2. An assembly as recited in claim 1, wherein the lock mount includes a slot adapted to receive the spring member.

3. An assembly as recited in claim 1, wherein the lock mount includes a tube for receiving the axle, the tube defining an axis.

4. An assembly a recited claim 3, wherein the slot includes a cam surface adapted to cooperate with the spring member to bias the spring member in a radially inward direction towards the axis.

5. An assembly as recited in claim 1, wherein the wheel and the spring member are internal, and together define a moving member.

6. An assembly as recited in claim 1, wherein the wheel lock comprises a first moving member, and a second moving member, the second moving member being slidably mounted relative to the first moving member.

7. An assembly as recited in claim 6, wherein the first moving member has an aperture and the second moving member has an aperture, the aperture on the second moving member being offset relative to the aperture on the first moving member when the wheel lock is in a first position such that the wheel hub is retained on the axle shaft, the aperture on the second moving member being aligned relative to the aperture on the first member when the wheel lock is in a second position such that the wheel hub is released from the axle shaft.

8. An assembly according to claim 7, wherein the means for biasing is a spring member disposed on the first member and a spring member disposed on the second member, each spring member urging the first spring member and the second spring member radially inward towards the axle shaft.

9. An assembly as recited in claim 6, wherein first moving member and the second moving member are each similar in size and shape.

10. An assembly as recited in claim 1, wherein the aperture of the first moving member and the aperture of the second moving member each are substantially rigid.

11. An assembly as recited in claim 1, wherein the wheel lock substantially surrounds the axle.

12. An assembly for connecting an axle shaft to a frame member, comprising:
    an inner member, said inner member including a frame receiving portion to interface with the frame member;
    an outer member oppositely disposed relative to the inner member, the outer member including a frame receiving portion to interface with the frame member, the frame receiving portion on the inner member and the frame receiving portion on the outer member cooperate to retain the frame member; and
    a claw disposed on the inner member adapted to secure the axle shaft to the inner member.

13. An assembly as recited in claim 12, wherein the inner member has an aperture and the outer member has an aperture, the aperture on the inner member and the aperture on the outer member being aligned such that axle shaft is receivable therein.

14. An assembly as recited in claim 12, wherein the inner member further comprising a resilient member adapted to retain the axle shaft.

15. An assembly as recited in claim 14, wherein the resilient member is a pair of claws adapted to engage the second slot.

16. An assembly as recited in claim 12, wherein the axle shaft comprises a first slot disposed at a first end of the axle shaft and a second slot disposed at a second end of the axle shaft, the first slot and the second slot is disposed approximately the same distance from the first end and the second end of the axle shaft respectively.

* * * * *